United States Patent

Nagy et al.

[11] Patent Number: 5,744,417
[45] Date of Patent: Apr. 28, 1998

[54] SUPPORTED CATALYST

[75] Inventors: Sandor Nagy, Grand Island; John A. Tyrell, Williamsville, both of N.Y.

[73] Assignee: Lyondell Petrochemical Company, Houston, Tex.

[21] Appl. No.: 643,102

[22] Filed: May 2, 1996

[51] Int. Cl.$^6$ .................................................. C08F 4/64
[52] U.S. Cl. .................... 502/155; 502/158; 502/162; 502/167; 502/169; 502/200; 502/232; 526/127; 526/160; 526/943
[58] Field of Search ................................. 502/155, 158, 502/162, 167, 169, 200, 232

[56] References Cited

U.S. PATENT DOCUMENTS

| | | |
|---|---|---|
| 4,604,442 | 8/1986 | Rich . |
| 4,945,076 | 7/1990 | Piotrowski . |
| 5,486,585 | 1/1996 | Murata et al. ..................... 526/130 |

FOREIGN PATENT DOCUMENTS

| | | |
|---|---|---|
| 0530230 | 3/1993 | European Pat. Off. . |
| 0621279 | 10/1994 | European Pat. Off. . |
| 06184226 | 7/1994 | Japan . |

*Primary Examiner*—David W. Wu
*Attorney, Agent, or Firm*—Liddell, Sapp, Zivley, Hill & LaBoon, LLP

[57] ABSTRACT

Disclosed is a supported catalyst which is the reaction product of (a) a silylamine polymer having the general formula

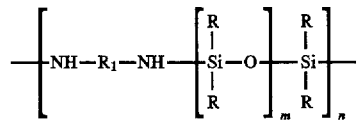

where each R is independently selected from alkyl from $C_1$ to $C_6$ or aryl from $C_6$ to $C_{10}$, $R_1$ is a divalent aliphatic or aromatic group from $C_2$ to $C_{20}$, "m" is 1 to about 100, and "n" is 2 to about 500, with (b) an organometallic compound having the general formula $$Q-M-(X)_3$$

where Q is a stabilizing ligand, each X is independently selected from halogen, alkyl from $C_1$ to $C_6$, or dialkylamino from $C_1$ to $C_6$, M is zirconium, titanium, or hafnium and M is bonded to a nitrogen in said silylamine polymer, and the ratio nitrogens bondable to M in said silylamine polymer to M atoms is 1:1 to 3:1.

20 Claims, No Drawings

SUPPORTED CATALYST

BACKGROUND OF THE INVENTION

This invention relates to a transition metal catalyst supported on a silylamine polymer. In particular, it relates to the reaction product of a silylamine polymer having the general formula

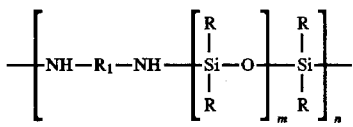

with an organometallic compound having the general formula

$Q-M-(X)_3$ where R is alkyl or aryl, $R_1$ is aliphatic or aromatic, Q is a stabilizing ligand, X is halogen, alkyl, or dialkyl amino, M is zirconium, titanium, or hafnium and bonds to a nitrogen in the silylamine polymer at a ratio of nitrogen to M of 1:1 to 3:1, m is 1 to 100, and n is 2 to 500.

Metallocene catalysts are a new class of catalysts which are gradually replacing Ziegler catalysts in polymerizing ethylene and propylene. A metallocene catalyst typically consists of a transition metal compound which has one or more cyclopentadienyl ring ligands. Because supported catalysts are more stable, produce higher molecular weight polymers, and may produce useful changes in the morphology of the polymer, metallocene catalysts are often used in conjunction with a support, such as silica gel. However, it can be difficult to control the amount of catalyst on a silica gel support. Also, silica gel can deactivate some catalysts and can leave high concentrations of ash in the polymer.

SUMMARY OF THE INVENTION

We have discovered that a metallocene-type of organometallic catalyst can be supported by bonding it through the transition metal atom to a nitrogen atom on a silylamine polymer. Because the catalysts of this invention are bonded to a support they are expected to be significantly more thermally stable than other comparable unsupported catalysts. And, unlike most other supported catalysts, the supported catalysts of this invention are liquids, not solids, or are readily soluble, and therefore they are more accessible to the reactants. Our supported catalysts also offer better control of catalyst concentration and placement, and produce less ash in the polymer.

DESCRIPTION OF THE PREFERRED EMBODIMENTS

Siloxane Oligomer

A silylamine polymer is prepared by reacting an amino monomer with a siloxane oligomer having the general formula

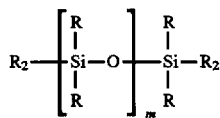

where each R is independently selected from alkyl from $C_1$ to $C_6$ or aryl from $C_6$ to $C_{10}$, $R_2$ is halogen or OR, and m is 1 to about 100, and is preferably 1 to 6 as those compounds are more readily available. The R group is preferably methyl and the $R_2$ group is preferably chlorine or methoxy as those compounds are more readily available.

Amino Monomer

The amino monomer that is reacted with the siloxane oligomer to make the silylamine polymer has the formula:

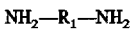

$NH_2-R_1-NH_2$ where $R_1$ is aliphatic or aromatic from $C_2$ to $C_{20}$ and may contain amino or other groups. Diamines are preferred as that reduces the amount of crosslinking, but tri or tetra amines can also be used. The amine can contain siloxy or other groups. Aliphatic amines are preferred due to their low color and hydrocarbon amines are preferred because they are more readily available. Amines having 5 to 12 carbon atoms are preferred as amines having fewer than 5 carbon atoms bring the transition metals bonded to them too close together for effective catalysis and amines having more than 12 carbon atoms lower the concentration of transition metal to support polymer. Examples of suitable aromatic amines include:

m-phenylenediamine (PDA);
p-phenylenediamine;
2,5-dimethyl-1,4-phenylenediamine (DPD);
2,4-(TDA), 2,5- and 2,6-diaminotoluene;
p- and m-xylylenediamine;
4,4'-diaminobiphenyl;
4,4'-diaminodiphenyl ether or 4,4'-oxydianiline (ODA);
3,4'-oxydianiline;
4,4'-diaminobenzophenone;
3,3', 3,4', or 4,4-diaminophenyl sulfone or m,m-, m,p- or p,p-sulfone dianiline;
4,4'-diaminodiphenyl sulfide;
3,3'-diaminodiphenyl sulfone (APS);
3,3' or 4,4'-diaminodiphenylmethane or m,m- or p,p-methylene dianiline;
3,3'-dimethylbenzidine;
2,2'-bis[(4-aminophenyl)-1,4-diisopropyl]benzene or 4,4'-isopropylidenedianiline or bisaniline P(BAP);
2,2'-bis[(4-aminophenyl)-1,3-diisopropyl]benzene or 3,3'-isopropylidenedianiline or bisaniline M;
methylene dianiline;
1,4-bis(4-aminophenoxy)benzene;
1,3-bis(4-aminophenoxy)benzene;
4,4'-bis(4-aminophenoxy)biphenyl;
1,3-bis(3-aminophenoxy)benzene (APB);
4,4'-bis(4-aminophenoxy)biphenyl;
2,4-diamine-5-chlorotoluene;
2,4-diamine-6-chlorotoluene;
2,2-bis-[4(4-aminophenoxy)phenyl]propane (BAPP);
trifluoromethyl-2,4-diaminobenzene;
trifluoromethyl-3,5-diaminobenzene;
2,2-bis(4-aminophenyl)-hexafluoropropane (6F diamine);
2,2-bis(4-phenoxy aniline) isopropylidene;
2,4,6-trimethyl-1,3-diaminobenzene;
4,4'-diamino-5,5'-trifluoromethyl diphenyloxide;
3,3'-diamino-5,5'-trifluoromethyl diphenyloxide;
4,4'-tri-fluoromethyl-2,2'-diamino biphenyl;
2,4,6-trimethyl-1,3-diaminobenzene;
diaminoanthraquinone;
4,4'-oxybis[(2-trifluoromethyl)benzeneamine] (1,2,4-OBABTF);
4,4'-oxybis[(3-trifluoromethyl)benzeneamine];
4,4'-thiobis[(2-trifluoromethyl)benzeneamine];

4,4'-thiobis[(3-trifluoromethyl)benzeneamine];
4,4'-sulfoxylbis[(2-trifluoromethyl)benzeneamine];
4,4'-sulfoxylbis[(3-trifluoromethyl)benzeneamine];
4,4'-ketobis[(2-trifluoromethyl)benzeneamine];
4,4'-[(2,2,2-trifluoromethyl-1-(trifluoromethyl)ethylidine) bis(3-trifluoromethyl)benzeneamine];
4,4'-dimethylsilylbis[(3-trifluoromethyl)benzeneamine].

Examples of suitable aliphatic-amines include 2-methyl-1,5-diamino pentane, 1,6-hexanediamine, 1,8-octanediamine, 1,12-diaminododecane, 1,4-diaminocyclohexane, and 1,4-bis(aminomethyl)-cyclohexane.

Examples of siloxane diamines that can be used include compounds having the formula

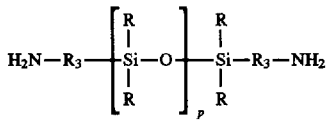

where $R_3$ is aliphatic or aromatic from $C_1$ to $C_{12}$ and p is 1 to 200 and is preferably 1 to 12. Examples of the R group for siloxane diamines include —$CH_3$, —$CF_3$, —$CH=CH_2$, —$(CH_2)_nCF_3$, —$C_6H_5$, —$CF_2$—$CHF$—$CF_3$, and

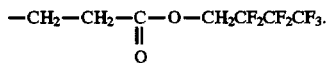

Examples of the $R_3$ group include —$(CH_2)_q$—, —$(CF_2)_q$—, —$(CH_2)_q(CF_2)_q$—, and —$C_6H_4$—, where each q is independently chosen from 1 to 10.

In order to make the amino monomer more reactive with the chloro or alkoxy terminated siloxane oligomer, especially if the oligomer is halogen terminated, the amino monomer is reacted in an organic solvent with a compound that removes a proton from the primary amine groups. Examples of such compounds include alkyl lithium compounds, e.g., methyl lithium or butyl lithium, or bases such as triethyl amine, which scavenge the acid byproduct. Organic solvents that can be used include toluene, hexane, diethyl ether, or tetrahydrofuran (THF). (It is preferable to use the same solvent used in the polymerization of the olefin, which is often hexane.)

Silylamine Polymer

The reaction of the amino monomer with the siloxane oligomer to produce the silylamine polymer can be performed at −78° C. to room temperature in an organic solvent. Stoichiometric quantities of the amino monomer and the siloxane oligomer are preferably used. While the reaction proceeds rapidly, it should be left overnight to ensure completion. The silylamine polymer product is a liquid and has the general formula

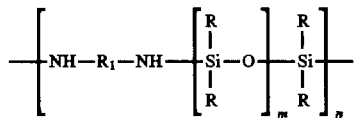

where R, $R_1$, and m have been defined, and n is 2 to about 500 and is preferably 4 to 50. The end groups have not been analyzed but are believed to be hydrogen and/or $R_2$.

Organometallic Compound

In the final step of preparing the supported catalyst, the silylamine polymer is reacted with an organometallic compound. The organometallic compound has the general formula

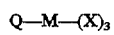

where Q is a stabilizing ligand, each X is independently selected from halogen, alkyl from $C_1$ to $C_6$ (preferably $C_1$), or dialkyl amino from $C_1$ to $C_6$ (preferably $C_1$), and M is zirconium, titanium, or hafnium. The X group is preferably halogen and most preferably chlorine as those compounds are readily available. M is preferably zirconium because a zirconium catalyst has good polymerization reactivity and stability.

The Q ligand can be a cyclopentadienyl ring with 0 to 5 substituent groups having the formula

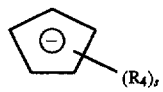

where each substituent group, $R_4$, is independently selected from a $C_1$ to $C_{20}$ hydrocarbyl group and s is a number from 0 to 5. In the case in which two $R_4$ groups are adjacent, they can be joined to produce a ring which is fused to the cyclopentadienyl (Cp) ring. Examples of alkyl substituted Cp rings include butyl cyclopentadienyl, methyl cyclopentadienyl, and pentamethylcyclopentadienyl. Examples of fused Cp ring ligands include indenyl, tetrahydroindenyl, fluorenyl, and 2-methylindenyl having the formulas

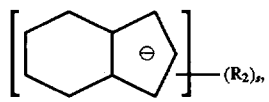

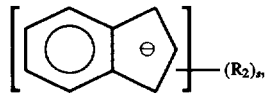

and

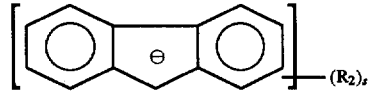

Examples of suitable Q ligands include alkyl substituted pyrrolyl or phospholyl rings having the formula

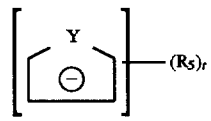

where Y is N or P, and is preferably N. Examples include 2-methylpyrrolyl, 3-methylpyrrolyl, 2,5-dimethylpyrrolyl, 2,5-di-tert-butylpyrrolyl, aryl substituted pyrrolyl rings such as 2-phenylpyrrolyl, 2,5-diphenylpyrrolyl, indolyl, alkyl substituted indolyls or their phosphoindenyl analogues having the formula

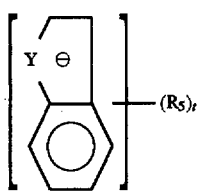

such as 2-methylindolyl, 2-tert-butylindolyl, 3-butylindolyl, 7-methylindolyl, 4,7-dimethylindolyl, aryl substituted indolyls such as 2-phenylindolyl, 3-phenylindolyl, 2-naphthylindolyl, isoindolyl, and alkyl and aryl substituted isoindolyls or their phosphoisoindenyl analogues having the formula

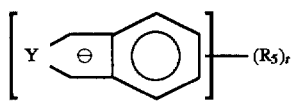

and carbazolyl and alkyl substituted carbazolyls having the formula

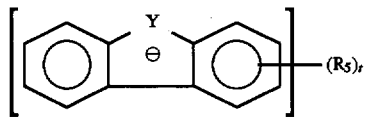

In the formulas, each $R_5$ is preferably independently selected from alkyl from $C_1$ to $C_{10}$, and aryl from $C_6$ to $C_{10}$ and t is 1 to the maximum number of substitutable positions. The alkyl and aryl substituents ($R_5$) on the pyrrolyl ring-containing ligand are not on the nitrogen atom in the ring but are on the carbon atoms of the ring.

The Q ligand can also contain a bora-benzene ring. A bora-benzene ring has the structure

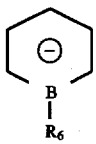

where $R_6$ can be hydrogen, $N(R)_2$, OR, or R. The $R_6$ group is preferably —$N(R)_2$ or phenyl, as those catalysts have the best properties and, if $R_6$ is —$N(R)_2$, then the R in —$N(R)_2$ is preferably methyl. Examples of such Q ligands include

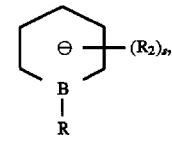

(bora-benzene)

-continued

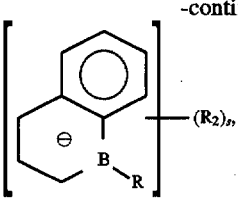

(bora-naphthalene)

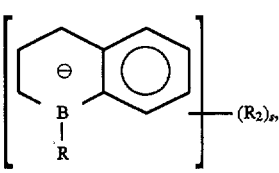

(bora-naphthalene)

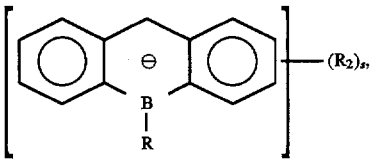

(bora-anthracene)

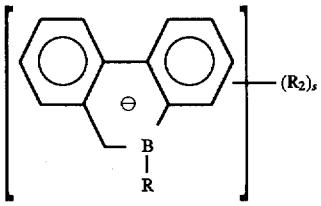

(bora-phenanthrene)

where "s" is 0 to the maximum number of substitutable positions, and is preferably 0 as those catalysts are easier to make.

The Q ligand can also have the formula

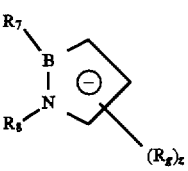

where $R_7$ is R, alkaryl from $C_6$ to $C_{12}$, aralkyl from $C_6$ to $C_{12}$, hydrogen or $Si(R)_3$, $R_8$ is $R_6$, halogen, COR, COOR, SOR, or SOOR, $R_9$ is $R_8$, OR, $N(R)_2$, SR, or a fused ring system, and z is 1 to 4. The preferred Q ligands are substituted or unsubstituted cyclopentadienyl, indenyl, and fluorenyl.

The Q ligand can also be:

The Q ligand can also be: 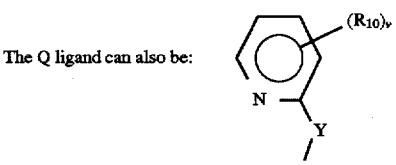

where Y is O, S, NR,

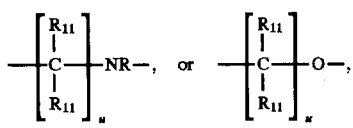

where each $R_{10}$ is independently selected from $C_1$ to $C_6$ alkyl, $C_1$ to $C_6$ alkoxy, $C_6$ to $C_{16}$ aryl, halogen, or $CF_3$, each $R_{11}$ is independently selected from hydrogen or $C_1$ to $C_6$ alkyl, "v" is 0 to 4, and "u" is 1 to 4. In the above formula, the Y group is preferably oxygen as those compounds are easier to make. For the same reason the R group is preferably methyl and "v" is preferably 0.

Supported Catalyst

If X is halogen a compound is preferably added to the silylamine polymer which removes a hydrogen from amine groups on the silylamine polymer to make the amine groups more reactive. (See hereinabove description of activating amines on diamine.) The organometallic compound is then added to the solution of the silylamine polymer. If X is alkyl or dialkylamino, it is not necessary to activate the amine by adding a compound to remove a hydrogen from amine groups. Preferably, X is halogen as then it is easier to handle the organometallic compound. The reaction of the silylamine polymer with the organometallic compound will proceed at −78° C. to room temperature in an organic solvent. (The same solvent can be used for all reactions.) The reaction mixture is preferably left overnight to ensure a complete reaction. The supported catalyst product is an oil dissolved in the solvent.

The ratio of reactive nitrogens on the silylamine polymer to metal (M) atoms in the organometallic compound determines the amount of crosslinking in the supported catalyst. It is preferable to use a 1:1 ratio of reactive nitrogen atoms to transition metal (M) atoms as catalysts made with those ratios are believed to be more active. Crosslinking in a 1:1 ratio catalyst is at a minimum, though there may still be some crosslinking that occurs inter-polymer or intra-polymer. At a 3:1 ratio of the nitrogen atoms to the metal atoms, the supported catalyst becomes highly crosslinked between different polymer molecules. Due to the crosslinking that occurs, a mixture of inter and intra crosslinked polymers will be present. It is therefore difficult to give a general formula for the supported catalyst of this invention. However, when the ratio of nitrogen atoms to metal atoms is 1:1, the supported catalysts will generally have the formula

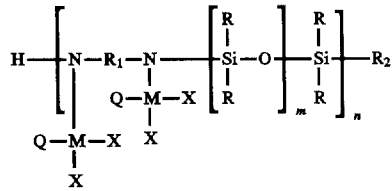

where the symbols have been hereinbefore described.

The supported catalyst of this invention is preferably used in combination with a co-catalyst. When X in the formula is alkyl, a boron-containing co-catalyst, such as perfluorotriphenylboron, can be used. Otherwise, co-catalysts such as polymethylaluminoxane (PMAO) or other co-catalysts known in the art can be used. The molar ratio of co-catalyst to catalyst can be about 0.01:1 to about 100,000:1. The supported catalyst is useful in polymerizing ethylene or propylene and is generally used in the same manner as other metallocene catalysts.

The following examples further illustrate this invention.

Example 1

To a solution of 1.00 g (0.0086 mole) 2-methyl-1,5-diaminopentane in 20 cc toluene, cooled to −78° C., was added 10.8 cc (0.0172 mole) of a 1.6M solution of n-butyl lithium in hexane. After the addition, the slurry was stirred and allowed to warm to room temperature, then stirred an additional 30 minutes at room temperature. The slurry ws again cooled to −78° C. and a solution of 2.39 g (0.0086 mole) 1,5-dichlorohexamethyltrisiloxane in 20 cc of toluene was added. Cooling was stopped, the slurry was stirred 16 hours at room temperature and was filtered, which removed 1.3 g of a white solid. To the filtrate, cooled to −78° C., was added 8.4 cc of a 1.6M solution of n-butyl lithium in hexane. The reaction mixture was stirred for 16 hours at room temperature and was diluted with toluene to a total volume of 60 cc. This solution was divided into three equal portions which were used in Examples 2 to 4.

Example 2

To 20 cc of the solution from Example 1, cooled to −78° C., was added 1.18 g cyclopentadienyl zirconium trichloride (1:1 N:Zr). The reaction mixture was stirred for 16 hours at room temperature and toluene was removed in vacuo to yield a solid catalyst used for polymerizations numbered Run 1.

Example 3

To 20 cc of the solution from Example 1, cooled to −78° C., was added 0.59 g cyclopentadienyl zirconium trichloride (2:1 N:Zr). The reaction mixture was stirred for 16 hours at room temperature and toluene was removed in vacuo to yield a solid catalyst used for polymerizations numbered Run 3.

Example 4

To 20 cc of the solution from Example 1, cooled to −78° C., was added 0.393 g cyclopentadienyl zirconium trichloride (3:1 N:Zr). The reaction mixture was stirred for 16 hours at room temperature and toluene removed in vacuo to yield a solid catalyst used for polymerizations numbered Runs 2, 4, and 5.

| Run | Catalyst Preparation | Solvent | Molar Ratio Al/M | $H_2$, ΔP | Reaction Time (minutes) |
|---|---|---|---|---|---|
| 1 | Ex 2 | toluene | 1242 | 5 | 15 |
| 2 | Ex 4 | toluene | 1841 | 5 | 15 |
| 3 | Ex 3 | toluene | 1203 | 5 | 15 |
| 4 | Ex 4 | toluene | 1473 | 0 | 15 |
| 5 | Ex 4 | hexane | 1167 | 5 | 60 |

In the table Al/M is the ratio of moles of aluminum in PMAO to moles of metal (zirconium) in the catalyst.

Melt flow properties of the polymer were determined in accordance with ASTM D-1238. The following table gives the results.

| Run | Catalyst Productivity (kg/gM/hr) | MI2 | MI20 | MFR |
|---|---|---|---|---|
| 1 | 151 | 4.6 | 117 | 26 |
| 2 | 1090 | 26 | 451 | 18 |
| 3 | 246 | 4.5 | 110 | 24 |
| 4 | 489 | 0.14 | 4.8 | 34 |
| 5 | 25 | >100 | | |

Example 5

Polymerizations

All polymerizations in this study were conducted in a 1.7 L reactor. Prior to conducting a polymerization, the reactor was "baked-out" by heating to 130° C. and holding at that temperature for 30 minutes under a nitrogen purge. Ethylene, hydrogen, hexene, butene, and nitrogen were treated by passage through columns containing 13X molecular sieves. For a typical polymerization, the reactor was charged with 0.850 L of hexane or toluene and, using a syringe, the required volume of diluted PMAO (AKZO). The desired amount of hydrogen was added to the reactor by monitoring the pressure drop ($\Delta P$) from a 1 L stainless steel vessel pressurized with hydrogen. A toluene solution containing 5 mg of catalyst was added to the reactor by nitrogen over pressure. The reactor was maintained at 80° C. throughout the run. Ethylene containing 10 gms butene was admitted to the reactor and controlled at 150 psi with feed on demand via a pressure regulator. After the reactor temperature and pressure stabilized, the catalyst slurry was charged into the reactor and polymerization initiated. Ethylene flow was monitored via a Brooks mass flow meter.

Polymerization was terminated by venting the reactor and the polymer recovered by filtration. The polymer was stabilized by the addition of about 1000 ppm of butylated hydroxytoluene/hexane (BHT) and further devolatilized 2 hours at 80° C. in a vacuum oven.

We claim:

1. A supported catalyst comprising the reaction product of
(a) a silylamine polymer having the general formula

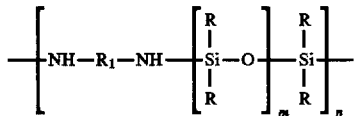

where each R is an alkyl from $C_1$ to $C_6$ or an aryl from $C_6$ to $C_{10}$, $R_1$ is a divalent aliphatic or aromatic group from $C_2$ to $C_{20}$, "m" is 1 to about 100, and "n" is 2 to about 500, with (b) an organometallic compound having the general formula

where Q is selected from the group consisting of:
(i.) a cyclopentadienyl ring structure of the formula:

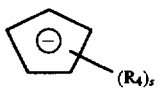

wherein each $R_4$ is a $C_1$ to $C_{20}$ hydrocarbyl group and further wherein two adjacent $R_4$ groups may form a ring fused to the cyclopentadienyl ring and s is a number from 0 to 5;

(ii.) an alkyl substituted pyrrolyl or phospholyl ring of the formula:

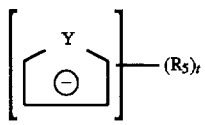

wherein Y is nitrogen or phosphorus and $R_5$ is a $C_1$ to $C_{10}$ alkyl group or a $C_6$ to $C_{10}$ aryl group; and t is 1 to the maximum number of substitutable positions, (iii.) a borabenzene ring of the formula:

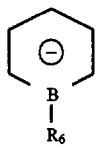

wherein $R_6$ is hydrogen, $N(R)_2$, or —OR or R;

(iv.) a heterocyclic ring of the formula:

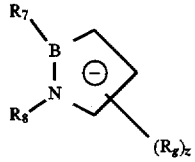

wherein $R_7$ is R, alkaryl from $C_6$ to $C_{12}$, aralkyl from $C_6$ to $C_{12}$, hydrogen or $Si(R)_3$, $R_8$ is $R_6$, halogen, COR, COOR, SOR, or SOOR, $R_9$ is $R_8$, OR, $N(R)_2$, SR, or a fused ring system; and z is 1 to 4;

The Q ligand can also be:

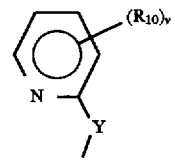

where Y is O, S, NR,

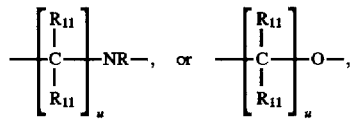

each $R_{10}$ is independently selected from the group consisting of $C_1$ to $C_6$ alkyl, $C_1$ to $C_6$ alkoxy, $C_6$ to $C_{16}$ aryl, halogen, and $CF_3$, each $R_{11}$ is a hydrogen or $C_1$ to $C_6$ alkyl, v is 0 to 4, and u is 1 to 4, each X is independently selected from the group consisting of halogen, alkyl from $C_1$ to $C_6$, and dialkylamino from $C_1$ to $C_6$, M is zirconium, titanium, or hafnium and M is bonded to a nitrogen in said silylamine polymer, and the ratio of nitrogens bonded to M in said silylamine polymer to M atoms is 1:1 to 3:1.

2. A supported catalyst according to claim 1 wherein R is methyl.

3. A supported catalyst according to claim 1 wherein $R_1$ contains no nitrogen atoms.

4. A supported catalyst according to claim 3 wherein $R_1$ is aliphatic.

5. A supported catalyst according to claim 4 wherein $R_1$ is a hydrocarbon with 5 to 12 carbon atoms.

6. A supported catalyst according to claim 1 wherein M is zirconium.

7. A supported catalyst according to claim 1 wherein M is titanium.

8. A supported catalyst according to claim 1 wherein Q is cyclopentadienyl, an alkyl substituted cyclopentadienyl, indenyl, fluorenyl, tetrahydroindenyl or 2-methylindenyl.

9. A supported catalyst according to claim 1 wherein X is halogen.

10. A supported catalyst according to claim 9 wherein X is chlorine.

11. A supported catalyst according to claim 1 wherein "m" is 1 to 6.

12. A supported catalyst according to claim 1 wherein "n" is 4 to 50.

13. A supported catalyst according to claim 1 having the formula

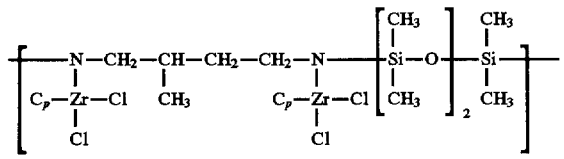

where Cp is cyclopentadienyl.

14. A supported catalyst according to claim 1 having the formula

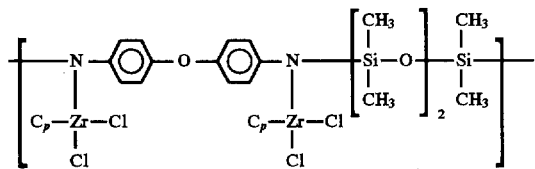

where Cp is cyclopentadienyl.

15. A supported catalyst according to claim 1 wherein Q is of the formula

wherein s is 0.

16. A supported catalyst according to claim 1 wherein Q is

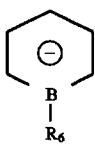

17. A method of making a supported catalyst comprising reacting a silylamine polymer having the general formula

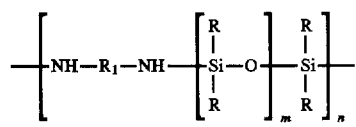

where each R is an alkyl from $C_1$ to $C_6$ or an aryl from $C_6$ to $C_{10}$, $R_1$ is a divalent aliphatic or aromatic group from $C_2$ to $C_{20}$, "m" is 1 to about 100, and "n" is 2 to about 500, with an organometallic compound having the general formula

where Q is selected from the group consisting of:

(i.) a cyclopentadienyl ring structure of the formula:

wherein each $R_4$ is a $C_1$ to $C_{20}$ hydrocarbyl group and further wherein two adjacent $R_4$ groups may form a ring fused to the cyclopentadienyl ring; and s is a number from 0 to 5;

(ii.) an alkyl substituted pyrrolyl or phospholyl ring of the formula:

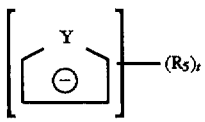

wherein Y is nitrogen or phosphorus and $R_5$ is a $C_1$ to $C_{10}$ alkyl group or a $C_6$ to $C_{10}$ aryl group; and t is 1 to the maximum number of substitutable positions;

(iii.) a borabenzene ring of the formula:

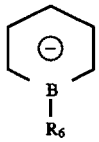

wherein $R_6$ is hydrogen, $N(R)_2$, or —OR or R;

(iv.) a hetrocyclic ring of the formula:

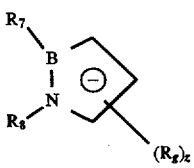

wherein $R_7$ is R, alkaryl from $C_6$ to $C_{12}$, aralkyl from $C_6$ to $C_{12}$, hydrogen or $Si(R)_3$, $R_8$ is $R_6$, halogen, COR, COOR, SOR, or SOOR, $R_9$ is $R_8$, OR, $N(R)_2$, SR, or a fused ring system; and z is 1 to 4; or The Q ligand can also be:

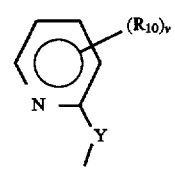

where Y is O, S, NR,

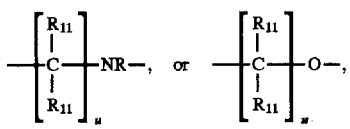

each $R_{10}$ is independently selected from the group consisting of $C_1$ to $C_6$ alkyl, $C_1$ to $C_6$ alkoxy, $C_6$ to $C_{16}$ aryl, halogen, and $CF_3$, each $R_{11}$ is a $C_1$ to $C_6$ alkyl, v is 0 to 4, and u is 1 to 4, each X is independently selected from the group consisting of halogen, alkyl from $C_1$ to $C_6$, and dialkylamino from $C_1$ to $C_6$, M is zirconium, titanium, or hafnium and M is bonded to a nitrogen in said silylamine polymer, and the ratio of nitrogens bonded to M in said silylamine polymer to M atoms is 1:1 to 3:1.

18. A method according to claim 17, wherein said silylamine polymer is made by reacting an amino monomer having the formula $NH_2$—$R_1$—$NH_2$ with a siloxane oligomer having the formula

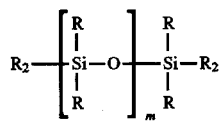

19. A method according to claim 18 wherein $R_2$ is chlorine or methoxy.

20. A supported catalyst having the general formula

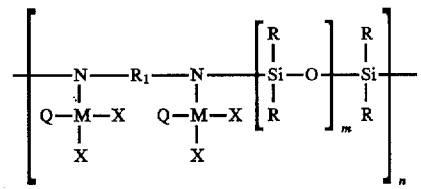

where each M is Zr or Ti, each Q is substituted or unsubstituted cyclopentadienyl, indenyl, an alkyl substituted cyclopentadienyl, tetrahydroindenyl, fluorenyl and 2-methylindenyl, each X is halogen or methyl, each R is alkyl from $C_1$ to $C_6$, $R_1$ is a 5 to 12 carbon atom aliphatic group, m is 1 to 6, and n is 4 to 50.

* * * * *

UNITED STATES PATENT AND TRADEMARK OFFICE
CERTIFICATE OF CORRECTION

PATENT NO : 5,744,417
DATED : April 28, 1998
INVENTOR(S) : Sandor Nagy et al.

It is certified that error appears in the above-identified patent and that said Letters Patent is hereby corrected as shown below:

Column 10, formula (iv.), that portion of the formula reading "$(R_g)_z$" should read --$(R_9)_z$--.

Column 10, Line 38, delete "The Q ligand can also be:" and insert the formula number --(v.)--.

Column 12, formula (iv.), that portion of the formula reading "$(R_g)_z$" should read --$(R_9)_z$--.

Column 12, Line 61, delete "The Q ligand can also be:" and insert the formula number --(v.)--.

Signed and Sealed this

Fourth Day of August, 1998

Attest:

BRUCE LEHMAN

*Attesting Officer*           Commissioner of Patents and Trademarks